(12) United States Patent
Koiso

(10) Patent No.: US 11,871,118 B2
(45) Date of Patent: Jan. 9, 2024

(54) VIDEO PROCESSING APPARATUS, VIDEO PROCESSING METHOD, AND RECORDING MEDIUM FOR VIDEO PROCESSING

(71) Applicant: JVCKENWOOD Corporation, Yokohama (JP)

(72) Inventor: Hisashi Koiso, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/823,534

(22) Filed: Aug. 31, 2022

(65) Prior Publication Data

US 2022/0417408 A1 Dec. 29, 2022

Related U.S. Application Data

(63) Continuation of application No. PCT/JP2020/046087, filed on Dec. 10, 2020.

(30) Foreign Application Priority Data

Mar. 12, 2020 (JP) ................................. 2020-042921

(51) Int. Cl.
*H04N 23/72* (2023.01)
*G06V 20/59* (2022.01)
*G06V 40/18* (2022.01)
*H04N 23/56* (2023.01)
*H04N 5/77* (2006.01)

(52) U.S. Cl.
CPC ........... *H04N 23/72* (2023.01); *G06V 20/597* (2022.01); *G06V 40/18* (2022.01); *H04N 5/77* (2013.01); *H04N 23/56* (2023.01)

(58) Field of Classification Search
None
See application file for complete search history.

(56) References Cited

U.S. PATENT DOCUMENTS

2008/0158357 A1* 7/2008 Connell ................. H04N 7/183
348/148
2015/0098654 A1* 4/2015 Kato ......................... G06T 7/97
382/190

FOREIGN PATENT DOCUMENTS

JP H06-313918 A 11/1994
JP 2007-026213 A 2/2007
(Continued)

OTHER PUBLICATIONS

International Preliminary Examination Report on Patentability (II) with Written Opinion of ISA from PCT/JP2020/046087 dated Mar. 14, 2022, 13 page.
(Continued)

*Primary Examiner* — Eileen M Adams
(74) *Attorney, Agent, or Firm* — Shih IP Law Group, PLLC

(57) ABSTRACT

A video processing apparatus includes a light irradiation unit, a video acquisition unit, a motion detection unit, and an imaging control unit. The light irradiation unit irradiates a face of an object of shooting with light. The video acquisition unit acquires a video capturing the face of the object of shooting. The motion detection unit detects a speed of motion of at least a portion of the face in the video acquired by the video acquisition unit. The imaging control unit changes an open period of a shutter in the video acquisition unit and a light emission intensity of the light irradiation unit based on the speed detected by the motion detection unit.

8 Claims, 6 Drawing Sheets

(56) References Cited

FOREIGN PATENT DOCUMENTS

| | | |
|---|---|---|
| JP | 2010-028635 A | 2/2010 |
| JP | 2014-109958 A | 6/2014 |
| JP | 2014-179686 A | 9/2014 |
| JP | 2017-004389 A | 1/2017 |

OTHER PUBLICATIONS

International Search Report for the corresponding PCT Application No. PCT/JP2020/046087 dated Mar. 9, 2021, 4 pages.

* cited by examiner

VIDEO PROCESSING APPARATUS, VIDEO PROCESSING METHOD, AND RECORDING MEDIUM FOR VIDEO PROCESSING

CROSS-REFERENCE TO RELATED APPLICATION

This application is a continuation of application No. PCT/JP2020/046087, filed on Dec. 10, 2020, and claims the benefit of priority from the prior Japanese Patent Application No. 2020-042921, filed on Mar. 12, 2020, the entire content of which is incorporated herein by reference.

BACKGROUND OF THE INVENTION

1. Field of the Disclosure

The present invention relates to a video processing apparatus, a video processing method, and a recording medium for video processing.

For example, a video processing apparatus such as a driver monitor mounted in a vehicle is configured to store a video obtained by capturing a scene in the vehicle interior in a storage apparatus. The video processing apparatus stores a video capturing a scene in the vehicle interior, stores a video mainly capturing the driver, etc.

For example, patent literature 1 discloses an anti-blur camera configured to control the use of a strobe properly. The anti-blur camera detects the amount of blur of a camera by means of a blur amount detection unit and determines a shutter speed used when a strobe is not used based on the brightness of an object of shooting by means of a shutter speed determination unit. The anti-blur camera predicts the amount of blur at the shutter speed used when a strobe is not used determined by the shutter speed determination unit by means of a blur amount prediction unit. The anti-blur camera determines whether or not to use strobe lights based on the output of the blur amount prediction unit by means of a strobe lighting determination unit.

Patent Literature 1: Japanese Unexamined Patent Application Publication No. 1994-313918

SUMMARY OF THE INVENTION

The anti-blur camera disclosed in patent literature 1 properly controls emission or non-emission of strobe lights but is not configured to make the light emission intensity variable to increase or decrease while the strobe lights are being emitted. When the driver monitor irradiates the face of the driver of the vehicle with light such as infrared light at a constant light emission intensity to capture an image, the eyes of the driver will be loaded. We have become aware of the fact that, when the motion of the outline, etc. of the eyes is detected to analyze the state (e.g., how open or closed the eyes are) of the driver, etc. of a vehicle, the load on the eyes can be mitigated by changing the open period of the shutter or the light emission intensity in accordance with speed of motion.

The video processing apparatus according to an embodiment includes: a light irradiation unit that irradiates a face of an object of shooting with light; a video acquisition unit that acquires a video capturing the face of the object of shooting; a motion detection unit that detects a speed of motion of at least a portion of the face in the video acquired by the video acquisition unit; and an imaging control unit that changes an open period of a shutter in the video acquisition unit and a light emission intensity of the light irradiation unit based on the speed detected by the motion detection unit.

Another embodiment relates to a video processing method. The video processing method includes: irradiating a face of an object of shooting with light; acquiring a video capturing the face of the object of shooting; detecting a speed of motion of at least a portion of the face in the video acquired; and changing an open period of a shutter in the acquiring and a light emission intensity in the irradiating based on the speed detected.

Still another embodiment relates to a recording medium for video processing. The recording medium for video processing encoded with a program causing a computer to implement modules including: a light irradiation module that irradiates a face of an object of shooting with light; a video acquisition module that acquires a video capturing the face of the object of shooting; a motion detection module that detects a speed of motion of at least a portion of the face in the video acquired by the video acquisition module; and an imaging control module that changes an open period of a shutter in the video acquisition module and a light emission intensity in the light irradiation module based on the speed detected by the motion detection module.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

Figure 1:
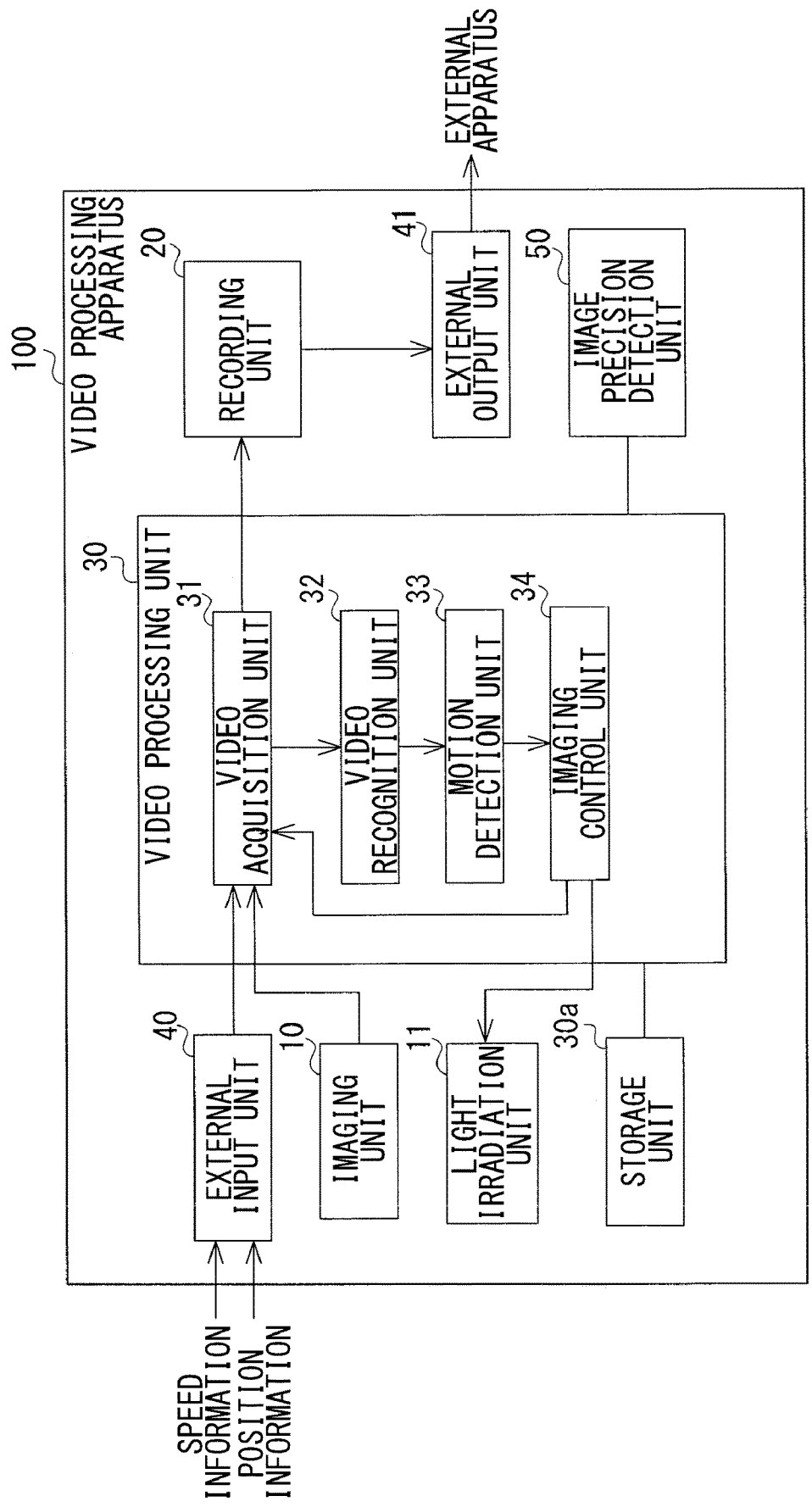
FIG. 1 is a block diagram showing a configuration of a video processing apparatus according to a first embodiment.

The invention will now be described by reference to the preferred embodiments. This does not intend to limit the scope of the present invention, but to exemplify the invention.

Hereinafter, the invention will be described based on a preferred embodiment with reference to FIGS. 1 through 6. Identical or like constituting elements and members shown in the drawings are represented by identical symbols and a duplicate description will be omitted as appropriate. Those of the members that are not important in describing the embodiment are omitted from the drawings.

First Embodiment

FIG. 1 is a block diagram showing a configuration of a video processing apparatus 100 according to the first embodiment. The video processing apparatus 100 is, for example, a driver monitor and is mounted in a vehicle to image a passenger in the vehicle interior continuously in time. The video processing apparatus 100 may record the video captured or discard the video without recording it. The video processing apparatus 100 is provided, for example, on the dashboard below the front window of the vehicle. The video processing apparatus 100 images, for example, the driver on board the vehicle as an object of shooting and recognizes the entirety of the face or a facial region such as the eyes in the object of shooting imaged.

The video processing apparatus 100 irradiates the face of the object of shooting with light such as infrared light for imaging so that the object of shooting can be recognized even in a dark scene at night or in a tunnel. Infrared light used for imaging is difficult for the vision of the driver, etc. to recognize, but the load on the eyes can be mitigated by suppressing the light emission intensity.

The video captured by the video processing apparatus 100 is used, for example, to identify the outlines of the left and right eyes to conduct an analysis related to portions of the eyes (e.g., how open or closed the eyes are, inclination of the left and right eyes, etc.). In this embodiment, a description of analysis function related to the state of a facial portion such as eyes is omitted. The video processing apparatus 100 may be provided with an analysis function related to how open or closed the eyes are, inclination of the left and right eyes, etc. An external apparatus may conduct an analysis of a facial portion based on the video collected or output by the video processing apparatus 100. The analysis function for analyzing how open or closed the eyes are, inclination of the eyes, etc. is used for determination of the sleepiness or the emotional state (e.g., a normal state, a tense state, etc.) of the object of shooting.

The video processing apparatus 100 includes an imaging unit 10, a light irradiation unit 11, a recording unit 20, a video processing unit 30, an external input unit 40, and an external output unit 41, an image precision detection unit 50, etc. The imaging unit 10 is, for example, a camera having a detector such as a CCD and images, for example, the driver on board the vehicle as an object of shooting. The imaging unit 10 acquires the video continuously in time and sends the acquired video to a video acquisition unit 31 described later.

The light irradiation unit 11 irradiates the object of shooting and, in particular, the facial portion, with light such as infrared light as appropriate so that the object of shooting such as the driver can be imaged even in the dark such as at night. The light emission intensity of light radiated from the light irradiation unit 11 is set by an imaging control unit 34 of the video processing unit 30 described later. It is preferred that the period of emission of light radiated by the light irradiation unit 11 concurs with the open period of the shutter, but there may be a slight time shift with respect to the open period of the shutter.

The recording unit 20 is, for example, a removable medium such as an SD card and a USB memory, or a hard disk, etc. The recording unit 20 shall be configured to record or delete the video acquired by the video acquisition unit 31. Hereinafter, a configuration provided with the recording unit 20 will be described, but the recording unit 20 may not be provided in case the video processing apparatus 100 is not configured to have a part that records a video. The recording unit 20 may be removable from the video processing apparatus 100. In this way, the recording unit 20 can be detached from the video processing apparatus 100 so that the video can be played back, etc. in a PC, etc.

The external input unit 40 acquires speed information, position information, etc. on the vehicle from an external apparatus. The external output unit 41 outputs video information, etc. processed by the video processing unit 30 to an external apparatus. The video processing apparatus 100 may append the speed information, the position information, etc. acquired by the external input unit 40 to the video and records the video or outputs the video outside.

The video processing unit 30 includes a video acquisition unit 31, a video recognition unit 32, a motion detection unit 33, and an imaging control unit 34. The video processing unit 30 is comprised of, for example, a CPU and performs the processes in the aforementioned units by operating in accordance with a computer program. A storage unit 30*a* is comprised of a data storage device such as a random access memory (RAM), a flash memory, and a hard disk recording device and stores the computer program etc. executed in the video processing unit 30. Further, the storage unit 30*a* stores a dictionary for recognition for recognizing the face, eyes, etc. of the object of shooting in the video captured.

The video acquisition unit 31 acquires the video captured by the imaging unit 10, subjects the video to a process such as data compression, and outputs the processed video to the recording unit 20. The video acquisition unit 31 may be configured to include the imaging unit 10. The open period of the shutter for imaging the object of shooting in the video acquisition unit 31 is set by the imaging control unit 34 described later. The frame rate of video frames is also set by the imaging control unit 34.

The video recognition unit 32 recognizes the face or eyes of the object of shooting in the video input from the video acquisition unit 31, based on the dictionary for recognition stored in the storage unit 30*a*. The recognition dictionary stored in the storage unit 30*a* includes shape data for the face, eyes, etc. The video recognition unit 32 recognizes the face, eyes, etc. by extracting a shape pattern presented in the video and checking the shape pattern against shape data included in the dictionary for recognition. The video recognition unit 32 can recognize the face, eyes, etc. in the video, by using a publicly known image recognition scheme that have been developed in various fields.

Figure 2A:
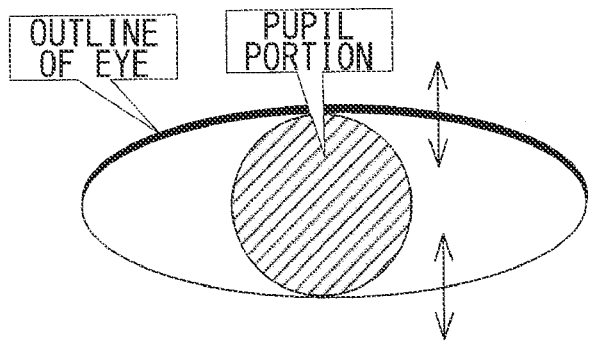
FIGS. 2A, 2B and 2C are schematic diagrams showing an example of detection of motion by the motion detection unit.
Figure 2B:
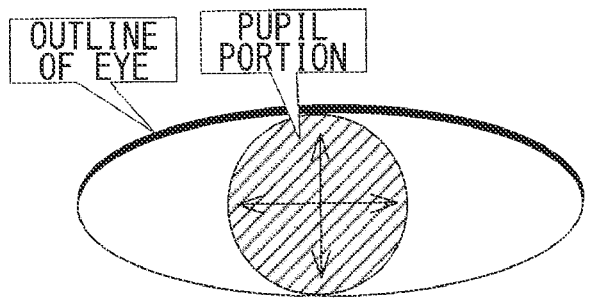
Figure 2C:
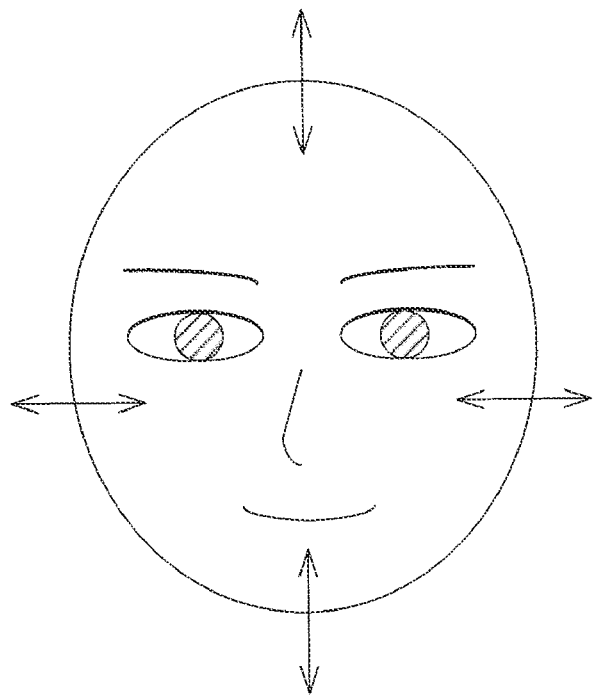

The motion detection unit 33 detects the motion of at least a portion of the face of the object of shooting and, in particular, detects the speed of motion. FIGS. 2A, 2B and 2C are schematic diagrams showing an example of detection of motion by the motion detection unit 33. The motion detection unit 33 detects, as shown in FIG. 2A, the blinking speed in an eye portion recognized by the video recognition unit 32 and outputs the speed to the imaging control unit 34. The blink of eyes is produced by a motion in which the outline portions of the eyes move up and down moment by moment.

When the speed of blink of eyes is slow, the open state and the closed state of the eyes produced by the blink of eyes can be recognized even if the open period of the shutter in the video acquisition unit 31 is set to be long. Conversely, when the speed of blink of eyes is fast, the open state and the closed state of the eyes produced by the blink of eyes cannot be recognized if the open period of the shutter in the video acquisition unit 31 is long, and so it is therefore necessary to set the open period of the shutter to be short.

Further, the motion detection unit 33 detects, as shown in FIG. 2B, the speed of motion of line of sight in an eye portion recognized by the video recognition unit 32 and outputs the speed to the imaging control unit 34. The motion of line of sight of the eyes is produced by a motion in which the pupil portions move left and right or up and down moment by moment.

When the speed of motion of line of sight is slow, image recognition in a video capturing the motion of line of sight is possible even if the open period of the shutter in the video acquisition unit 31 is set to be long. Further, when the speed of motion of line of sight is fast, it is necessary to set the open period of the shutter in the video acquisition unit 31 to be short.

Further, the motion detection unit 33 detects, as shown in FIG. 2C, the speed of swinging motion of the face as a whole by referring to the face as a whole recognized by the video recognition unit 32 and outputs the speed to the imaging control unit 34. The swinging motion of the face is produced by a motion in which the outline of the face or a particular portion (e.g., the nose portion) moves left and right or up and down moment by moment.

When the speed of swinging motion of the face is slow, image recognition in a video capturing the swinging motion of the face is possible even if the open period of the shutter in the video acquisition unit 31 is set to be long. Further, when the speed of swinging motion of the face is fast, it is necessary to set the open period of the shutter in the video acquisition unit 31 to be short.

Figure 3:
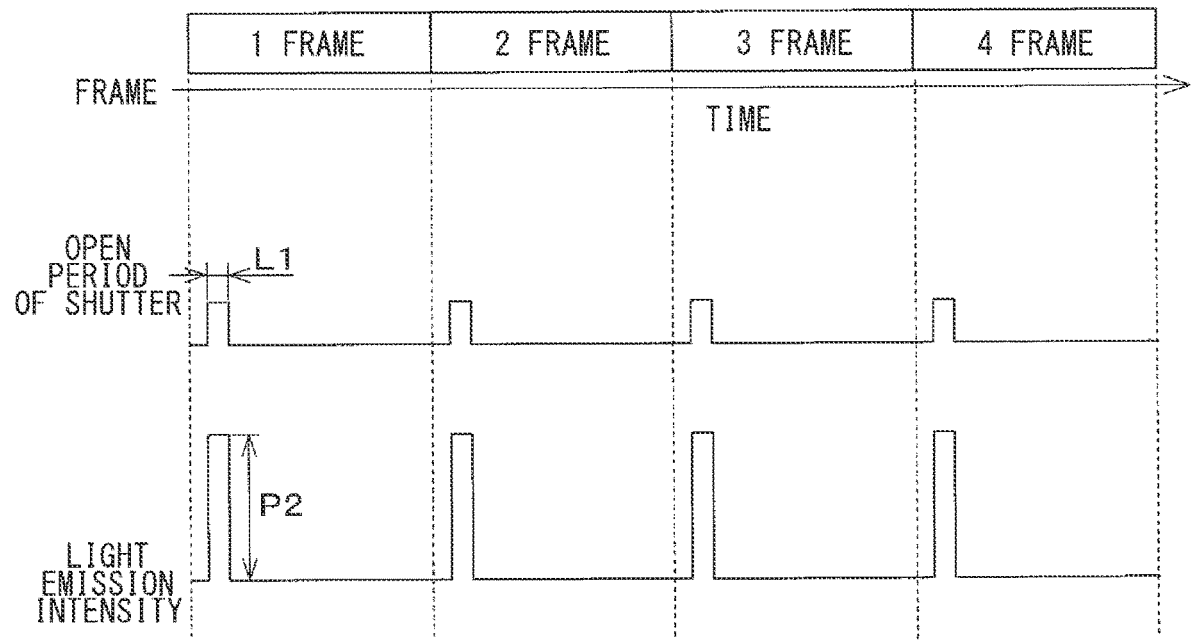
FIG. 3 is a timing chart showing a case in which the open period of the shutter is set to be short.
Figure 4:
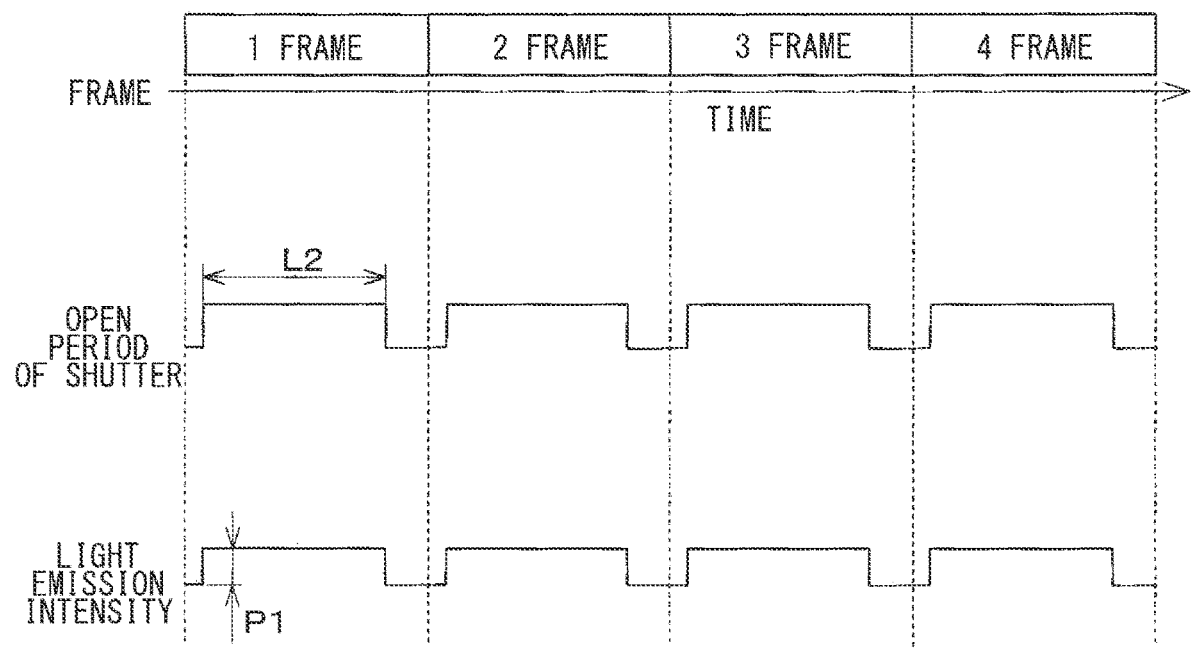
FIG. 4 is a timing chart showing a case in which the open period of the shutter is set to be long.

The imaging control unit 34 sets the open period of the shutter in the video acquisition unit 31 and the light emission intensity of the light irradiation unit 11 to change, based on the speed of motion of at least a portion of the face of the object of shooting detected by the motion detection unit 33. FIG. 3 is a timing chart showing a case in which the open period of the shutter is set to be short, and FIG. 4 is a timing chart showing a case in which the open period of the shutter is set to be long.

When the speed of motion of at least a portion of the face of the object of shooting is fast, the open period of the shutter in the video acquisition unit 31 is set to a value L1 indicating a short period and sets the light emission intensity of the light irradiation unit 11 to a large value P2. The imaging control unit 34 defines a predetermined threshold value in advance for the speed of motion of at least a portion of the face of the object of shooting. When the speed of motion of at least a portion of the face input from the motion detection unit 33 is equal to or larger than the threshold value, the imaging control unit 34 determines that the speed of motion is fast. When the input speed is smaller than the threshold value, the imaging control unit 34 determines that the speed of motion is slow.

When the speed of motion of at least a portion of the face of the object of shooting is slow, the imaging control unit 34 sets the open period of the shutter in the video acquisition unit 31 to a value L2 (L2>L1) indicating a long period and sets the light emission intensity of the light irradiation unit 11 to a small value P1 (P1<P2). The imaging control unit 34 defines a predetermined threshold value in advance for the speed of motion of at least a portion of the face of the object of shooting. When the speed of motion of at least a portion of the face input from the motion detection unit 33 is equal to or larger than the threshold value, the imaging control unit 34 determines that the speed of motion is fast. When the input speed is smaller than the threshold value, the imaging control unit 34 determines that the speed of motion is slow. L1 and L2, which are open periods of the shutter, and P1 and P2, which are light emission intensity values, may be predefined by assuming a dark environment such as at night or assuming the speed of motion of the face of the object of shooting.

When the speed of motion of at least a portion of the face of the object of shooting is slow, the imaging control unit 34 sets the open period of the shutter in the video acquisition unit 31 to be longer and sets the light emission intensity of the light irradiation unit 11 to be smaller than those of the case in which the speed of motion is fast. Alternatively, the imaging control unit 34 may set the open period of the shutter and the light emission intensity to vary continuously in accordance with the speed of motion of at least a portion of the face of the object of shooting.

As described above, the motion of at least a portion of the face of the object of shooting is exemplified by the blink of eyes, the motion of line of sight, and the swinging motion of the face. The imaging control unit 34 sets the open period of the shutter and the light emission intensity to vary in accordance with these motions.

The image precision detection unit 50 detects the image recognition precision in the face of the object of shooting or in a facial portion such as the eyes and the nose and checks whether a sufficient image recognition precision is secured. The image recognition precision is a measure indicating whether it is possible to recognize a facial portion such as the eyes and the nose, the outline of the face, or the like in distinction from an adjacent portion. Specifically, the degree of image blur, etc. at a boundary portion is defined as an indicator.

Further, when an analysis is conducted to see how open or closed the eyes are, the inclination of the eyes, etc., the image precision detection unit 50 may check whether image precision is secured to a degree that enables analysis. When an analysis is conducted to see how open or closed the eyes are, the inclination of the eyes, etc., whether the brightness value in the white portion of the eye and in the pupil portion defines a difference that makes the portions distinguishable carries weight. The image precision may be defined based on a difference in brightness values between the portions. In other words, the image precision may be defined to be low when the difference in brightness value between the portions is small, and the image precision may be defined to be high when the difference in brightness value is large.

When the open period of the shutter is changed from a value representing a short period to a value representing a long period, for example, the imaging control unit 34 changes the setting of the open period of the shutter to a value representing a long period provided that the image recognition precision is better than a predetermined threshold value. When a sufficient image recognition precision cannot be secured after the imaging control unit 34 changes the setting of the open period of the shutter to a value representing a long period, the imaging control unit 34 returns the open period of the shutter to a value representing a short period. Similarly, when the light emission intensity is changed from a large value to a small value, for example, the imaging control unit 34 changes the setting of the light emission intensity to a small value provided that the image recognition precision is better than a predetermined threshold value. When a sufficient image recognition precision cannot be secured after the imaging control unit 34 changes the setting of the light emission intensity to a small value, the imaging control unit 34 returns the light emission intensity to a large value.

Further, in changing the setting of the open period of the shutter to a value representing a long period, the imaging control unit 34 may gradually change the setting of the shutter open period from a value representing a short period to a value representing a long period, checking that the image recognition precision detected by the image precision detection unit 50 is proper. Similarly, in changing the setting of the light emission intensity to a small value, the imaging control unit 34 may gradually change the setting of the light emission intensity from a large value to a small value, checking that the image recognition precision detected by the image precision detection unit 50 is proper.

Figure 5:
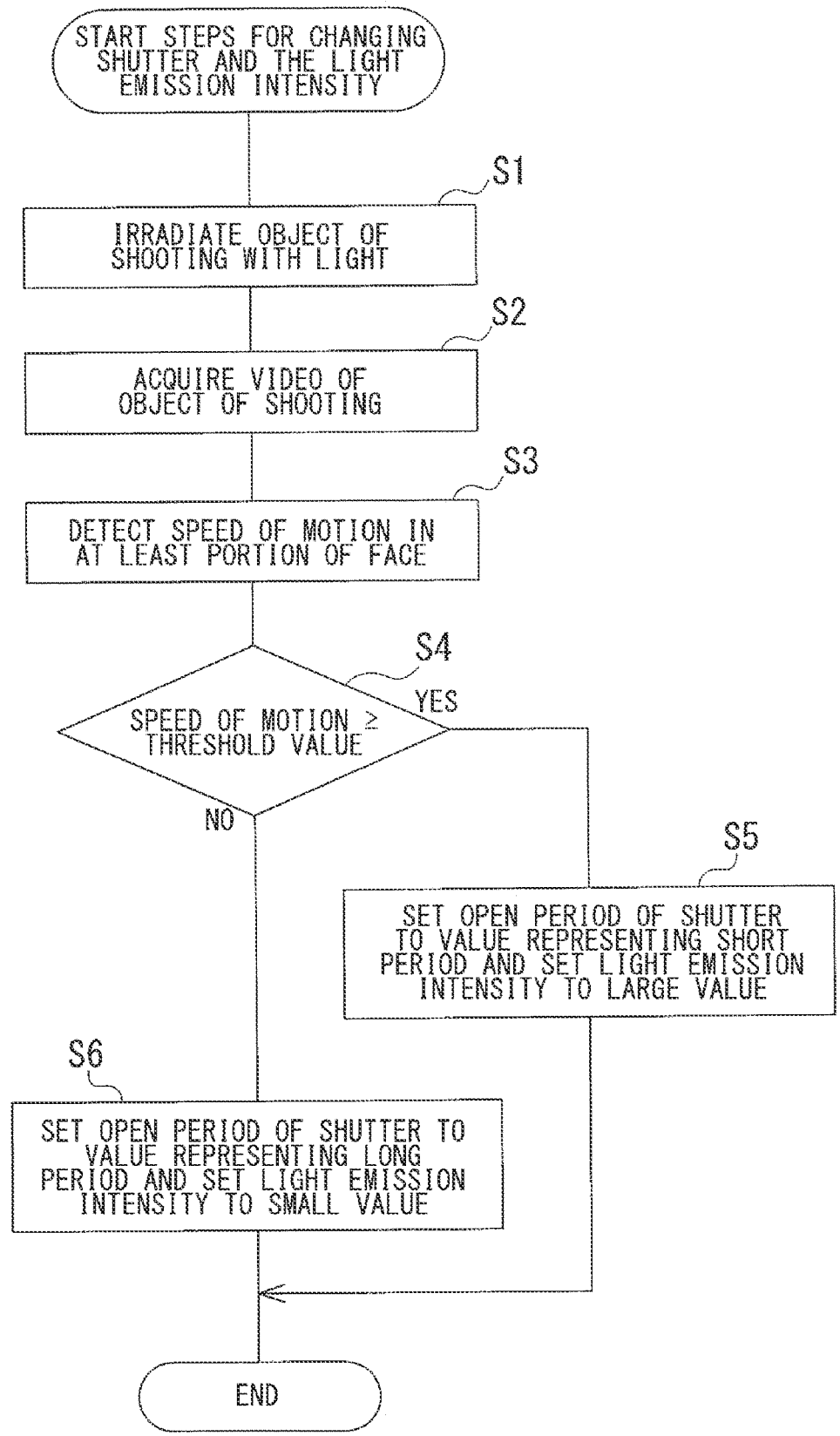
FIG. 5 is a flowchart showing a sequence of steps for changing the shutter and the light emission intensity performed in the video processing apparatus.

A description will now be given of the operation of the video processing apparatus 100, based on the process of changing the shutter and the light emission intensity. FIG. 5 is a flowchart showing a sequence of steps for changing the shutter and the light emission intensity performed in the video processing apparatus 100. The light irradiation unit 11 of the video processing apparatus 100 starts irradiating the object of shooting with light (S1) and acquires the video of the object of shooting captured by the imaging unit 10 by means of the video acquisition unit 31 (S2). The video recognition unit 32 recognizes at least a portion of the face of the object of shooting in the image, and the motion detection unit 33 detects the speed of motion of the recognized portion (S3).

The imaging control unit 34 determines whether the speed of motion detected by the motion detection unit 33 is equal to or larger than a predetermined threshold value (S4). When the imaging control unit 34 determines that the speed of motion of at least a portion of the face of the object of shooting is equal to or larger than the predetermined threshold value (S4: YES), the imaging control unit 34 sets the open period of the shutter in the video acquisition unit 31 to a value representing a short period, sets the light emission intensity of the light irradiation unit 11 to a large value (S5), and terminates the process. It should be noted that, when the open period of the shutter is set to be short and the light emission intensity is set to a large value prior to the determination in step S4, the imaging control unit 34 maintains the setting.

When the imaging control unit 34 determines that the speed of motion of at least a portion of the face of the object of shooting is less than the threshold value in step S4 (S4: NO), the imaging control unit 34 sets the open period of the shutter in the video acquisition unit 31 to a value representing long period, sets the light emission intensity of the light irradiation unit 11 to a small value (S6), and terminates the process.

Further, when the image recognition precision detected by the image precision detection unit 50 in the video acquired after step S6 drops, the imaging control unit 34 may change the setting to set the open period of the shutter to a value representing a short period and set the light emission intensity of the light irradiation unit 11 to a large value. Alternatively, as described above, the imaging control unit 34 may set the open period of the shutter and the light emission intensity to vary continuously in accordance with the speed of motion of at least a portion of the face of the object of shooting.

When the speed of motion of at least a portion of the face of the object of shooting is slower than the predetermined threshold value, the video processing apparatus 100 sets the open period of the shutter in the video acquisition unit 31 to a value representing a long period and sets the light emission intensity of the light irradiation unit 11 to a small value. The video processing apparatus 100 can mitigate the load on the eyes of the object of shooting by setting the light emission intensity to a small value and can obtain a bright video by irradiating the object of shooting with a light mount necessary for imaging by setting the open period of the shutter to a value representing a long period.

When the speed of motion of at least a portion of the face of the object of shooting is faster than the predetermined threshold value, the video processing apparatus 100 sets the open period of the shutter in the video acquisition unit 31 to a value representing a short period and sets the light emission intensity of the light irradiation unit 11 to a large value. The video processing apparatus 100 can suppress reduction in the image recognition precision when the motion of at least a portion of the face of the object of shooting is fast, by setting the open period of the shutter to a value representing a short period, and can acquire a bright video by setting the light emission intensity to a large value.

The video processing apparatus 100 detects, as motion of at least a portion of the face of the object of shooting, the blink of eyes, the motion of line of sight, the swinging motion of the face, or the like, by means of the motion detection unit 33. A video of an open state and a closed state of the eyes can be acquired properly by changing the open period of the shutter and the light emission intensity in accordance with the speed of the blink of eyes in the object of shooting.

Further, a video capturing the motion of line of sight can be acquired properly by changing the open period of the shutter and the light emission intensity in accordance with the speed of motion of line of sight. Similarly, it is possible to ensure that a video capturing the direction (leftward, rightward, upward, downward) in which the object of shooting faces is captured by changing the open period of the shutter and the light emission intensity in accordance with the speed of swinging motion of the face.

Second Embodiment

Figure 6:
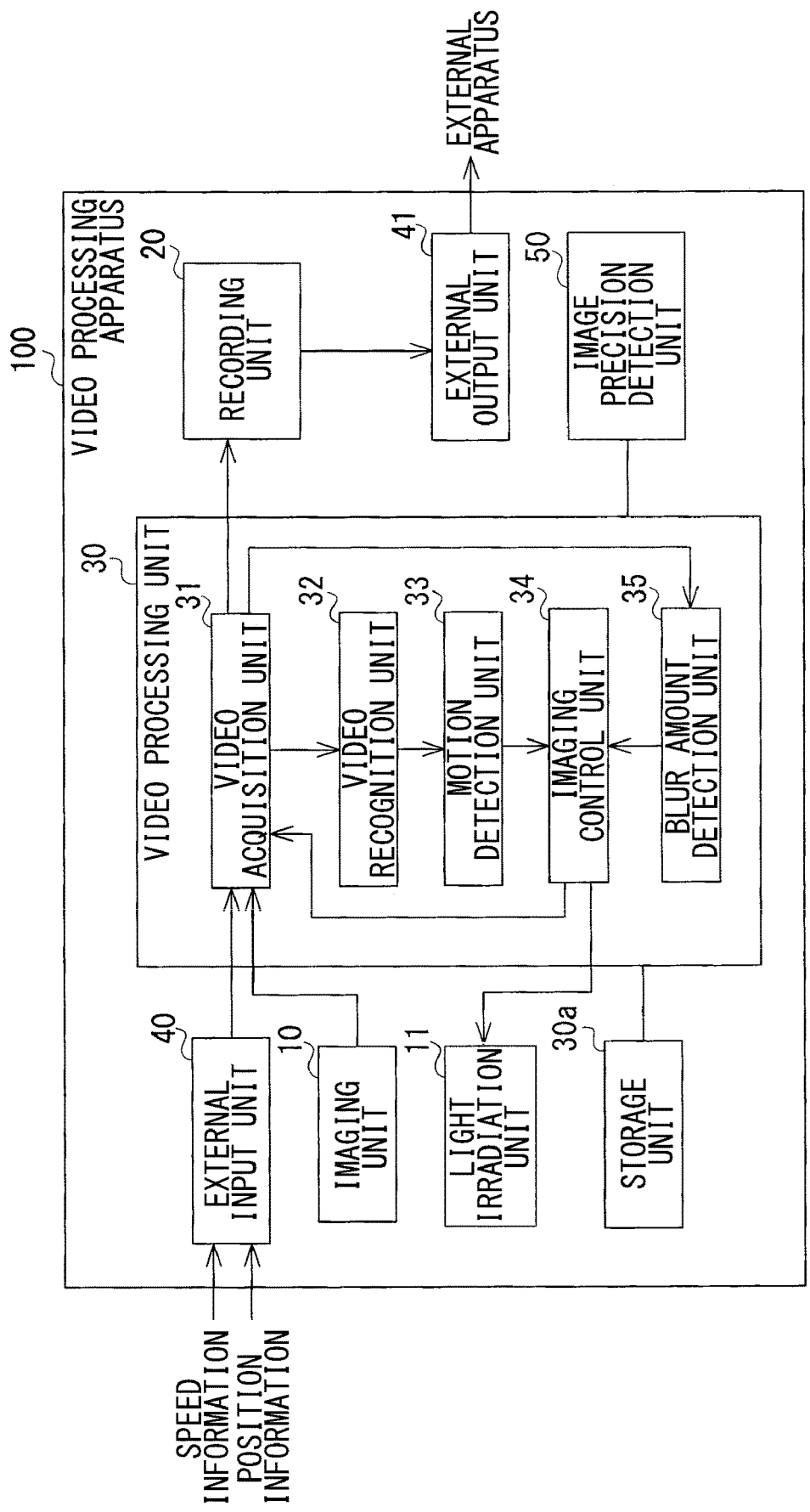
FIG. 6 is a block diagram showing a configuration of a video processing apparatus according to a second embodiment.

FIG. 6 is a block diagram showing a configuration of a video processing apparatus according to the second embodiment. The video processing apparatus 100 according to the second embodiment further includes a blur amount detection unit 25 in addition to the features in embodiment 1. The blur amount detection unit 35 detects the amount of blur in the video of the object of shooting produced by a vibration or the like of the vehicle in which the video processing apparatus 100 is mounted by, for example, referring to doubled images or blur in an edge portion in the video acquired by the video acquisition unit 31.

The imaging control unit 34 changes the open periods L1 and L2 of the shutter and the light emission intensity values P1 and P2 in accordance with the blur amount detected by the blur amount detection unit 35. The imaging control unit 34 sets the open period of the shutter to be short and the light emission intensity to be large when the blur amount is large. Further, the imaging control unit 34 sets the open period of the shutter to be long and the light emission intensity to be small when the blur amount is small.

The video processing apparatus 100 can mitigate the load on the eyes of the object of shooting while suppressing reduction in the image recognition precision at the same time, by changing the open periods L1 and L2 of the shutter and the light emission intensity values P1 and P2 in accordance with the blur amount detected by the blur amount detection unit 35.

Variation

In the embodiments described above, an example is shown in which the open period of the shutter and the light emission intensity are made variable without changing the frame rate of the video, but the frame rate of the video may also be changed. When the speed of motion of at least a portion of the face of the object of shooting is slow and the blur amount is small, the imaging control unit 34 may lower the frame rate of the video acquired by the video acquisition unit 31 within a range in which the image recognition precision for analyzing how open or closed the eyes are, the inclination of the eyes, etc. is sufficiently secured.

The video processing apparatus 100 can further mitigate the load on the eyes of the object of shooting by lowering the frame rate of the video acquired and setting the open period of the shutter to be long and the light emission intensity to be small by means of the imaging control unit 34.

In the embodiments described above, an example is shown of detecting, as motion of at least a portion of the face of the object of shooting, the blink of eyes, the motion of line of sight, the swinging motion of the face, or the like, by means of the motion detection unit 33, but the motion of the mouth, the noise, etc. may be detected. Further, the motion detection unit 33 may detect, as motion of at least a portion of the face of the object of shooting, one or a plurality of motions including the blink of eyes, the motion of line of sight, etc. The imaging control unit 34 may change the open period of the shutter and the light emission intensity based on the speed of one or a plurality of motions.

Further, the imaging control unit 34 may set the light emission intensity of the light irradiation unit 11 to 0 when the outside light irradiating the object of shooting is intense and the light amount is sufficiently secured. The imaging control unit 34 may set the open period of the shutter to be short to increase the image recognition precision, provided the light amount is more than enough. The video processing apparatus 100 may further include an open/closed eye detection unit (not shown) that detects an open state and a closed state of the eyes in the video. When the eyes are closed, the video processing apparatus 100 may give priority to image recognition precision and set the open period of the shutter to be short and the light emission intensity to be large.

Further, the video processing apparatus 100 may sense sunglasses etc. that cut the wavelength range of the light source used in the light irradiation unit 11 and sets the open period of the shutter to be short and light emission intensity to be large when the object of shooting is wearing sunglasses that meet the condition, giving priority to image recognition precision.

A description will now be given of the features of the video processing apparatus 100, the video processing method, and the video processing program according to the embodiments and the variation described above. The video processing apparatus 100 includes the light irradiation unit 11, the video acquisition unit 31, the motion detection unit 33, and the imaging control unit 34. The light irradiation unit 11 irradiates the face of an object of shooting with light. The video acquisition unit 31 acquires a video capturing the face of the object of shooting. The motion detection unit 33 detects the speed of motion of at least a portion of the face in the video acquired by the video acquisition unit 31. When the speed detected by the motion detection unit 33 is slower than a predetermined threshold value, the imaging control unit sets the open period of the shutter in the video acquisition unit 31 to be long and the light emission intensity of the light irradiation unit 11 to be small. When the speed is faster than the predetermined threshold value, the imaging control unit 34 sets the open period of the shutter in the video acquisition unit 31 to be short and the light emission intensity of the light irradiation unit 11 to be large. This allows the video processing apparatus 100 to set the light emission intensity to a small value and mitigate the load on the eyes of the object of shooting irradiated with light.

Further, the motion detection unit 33 detects the speed of blink in the eye portion in the video. This allows the video processing apparatus 100 to change the open period of shutter and the light emission intensity in accordance with the speed of blink of eyes and acquire a video of an open state and a closed state of the eyes properly.

Further, the motion detection unit 33 detects the speed of motion of line of sight in the video. This allows the video processing apparatus 100 to change the open period of the shutter and the light emission intensity in accordance with the speed of motion of line of sight and properly acquire a video capturing the motion of line of sight.

Further, the motion detection unit 33 detects the speed of motion of swinging motion of the face in the video. This allows the video processing apparatus 100 to ensure that a video capturing the direction (leftward, rightward, upward, downward) in which the object of shooting faces is acquired by changing the open period of the shutter and the light emission intensity in accordance with the speed of swinging motion of the face.

The video processing apparatus 100 further includes the blur amount detection unit 35 for detecting the blur amount of the object of shooting. The imaging control unit 34 changes the open period of the shutter and the light emission intensity in accordance with the blur amount detected by the blur amount detection unit 35. This allows the video processing apparatus 100 to mitigate the load on the eyes of the object of shooting while suppressing reduction in the image recognition precision at the same time.

Further, the video processing apparatus 100 changes the frame rate of the video acquired by the video acquisition unit 31 based on the speed detected by the motion detection unit 33. This allows the video processing apparatus 100 to mitigate the load on the eyes by lowering the frame rate of the video acquired and, further, setting the open period of the shutter to be long and the light emission intensity to be small.

The video processing method includes a light irradiation step, a video acquisition step, a motion detection step, and an imaging control step. The light irradiation step irradiates the face of an object of shooting with light. The video acquisition step acquires a vide capturing the face of the object of shooting. The motion detection step detects a speed of motion of at least a portion of the face in the video acquired by the video acquisition step. When the speed of motion by the motion detection step is slower than a predetermined threshold value, the imaging control step sets the open period of the shutter in the video acquisition step to be long and light emission intensity in the light irradiation step to be small. When the speed is faster than the predetermined threshold value, the imaging control step sets the open period of the shutter in the video acquisition step to be short and the light emission intensity in the light irradiation step to be large. According to this video processing method, it is possible to set the light emission intensity to a small value to mitigate the load on the eyes of the object of shooting irradiated with light.

A non-transitory recording medium for video processing encoded with a program causes a computer to execute a light irradiation step, a video acquisition step, a motion detection step, and an imaging control step. The light irradiation step irradiates the face of an object of shooting with light. The video acquisition step acquires a vide capturing the face of the object of shooting. The motion detection step detects a speed of motion of at least a portion of the face in the video acquired by the video acquisition step. When the speed detected by the motion detection step is slower than a predetermined threshold value, the imaging control step sets the open period of the shutter in the video acquisition step to be long and light emission intensity in the light irradiation step to be small. When the speed is faster than the predetermined threshold value, the imaging control step sets the open period of the shutter in the video acquisition step to be short and the light emission intensity in the light irradiation step to be large. According to this video processing program, it is possible to set the light emission intensity to a small value to mitigate the load on the eyes of the object of shooting irradiated with light.

Described above is an explanation based on an exemplary embodiment. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A video processing apparatus comprising:
a light irradiator that irradiates a face of an object of shooting with light;
a video acquirer that acquires a video capturingthe face of the object of shooting,
a motion detector that detects a speed of motion of at least a portion of the face in the video acquired by the video acquirer;
an open/closed eye detector that detects an open state and a closed state of eyes in the video acquired by the video acquirer; and
an imaging controller that changes an open period of a shutter in the video acquirer and a light emission intensity of the light irradiator based on the speed detected by the motion detector and the open state and the closed state of the eyes detected by the open/closed eye detector,
wherein the motion detector detects at least one of a speed of blink in an eye portion in the video and a speed of swinging motion of the face in the video.

2. The video processing apparatus according to claim 1, wherein
the motion detector detects a speed of motion of line of sight in the video.

3. The video processing apparatus according to claim 1, wherein
a frame rate of the video acquired by the video aquirer is changed based on the speed detected by the motion detector.

4. A video processing apparatus comprising:
a light irradiator that irradiates a face of an object of shooting with light;
a video acquirer that acquires a video capturing the face of the object of shooting;
a motion detector that detects a speed of motion of at least a portion of the face in the video acquired by the video acquirer;
an open/closed eye detector that detects an open state and a closed state of eyes in the video acquired by the video acquirer;
an imaging controller that changes an open period of a shutter in the video acquirer and a light emission intensity of the light irradiator based on the speed detected by the motion detector and the open state and the closed state of the eyes detected by the open/closed eye detector; and
a blur amount detector that detects an amount of blur of the object of shooting,
wherein the imaging controller changes the open period of the shutter and the light emission intensity in accordance with the blur amount detected by the blur amount detector.

5. A video processing apparatus comprising:
a light irradiator that irradiates a face of an object of shooting with light;
a video acquirer that acquires a video capturing the face of the object of shooting;
a motion detector that detects a speed of motion of at least a portion of the face in the video acquired by the video acquirer;
an open/closed eye detector that detects an open state and a closed state of eyes in the video acquired by the video acquirer;
an imaging controller that changes an open period of a shutter in the video acquirer and a light emission intensity of the light irradiator based on the speed detected by the motion detector and the open state and the closed state of the eyes detected by the open/closed eye detector; and
an image precision detector that detects an image recognition precision in the video acquired after the imaging controller changes the open period of the shutter and the light emission intensity, wherein
the imaging controller changes the open period of the shutter and the light emission intensity in accordance with the image recognition precision detected.

6. A video processing method comprising:
irradiating a face of an object of shooting with light;
acquiring a video capturing the face of the object of shooting;
detecting a speed of motion of at least a portion of the face in the video acquired;
detecting an open state and a closed state of eyes in the video acquired; and
changing an open period of a shutter in the acquiring and a light emission intensity in the irradiating based on the speed detected and the open state and the closed state of the eyes detected, wherein
the detecting detects at least one of a speed blink in an eye portion in the video and a speed of swinging motion of the face in the video.

7. A non-transitory recording storing executable instructions that, in response to execution, cause a computer to perform video processing operations comprising:
irradiating a face of an object of shooting with light;
acquiring a video capturing the face of the object of shooting;
detecting a speed of motion of at least a portion of the face in the video acquired;
detecting an open state and a closed state of eyes in the video acquired;and
changing an open period of a shutter in the acquiring and a light emission intensity in the irradiating based on the speed detected and the open state and the closed state of the eyes detected, wherein
the detecting the speed of motion includes detecting at least one of a speed of blink in an eye portion in the video and a speed of swinging motion of the face in the video.

8. A video processing apparatus comprising:
a light irradiator that irradiates a face of an object of shooting with light;
a video acquirer that acquires a video capturing the face of the object of shooting;

a motion detector that detects a speed of motion of at least a portion of the face in the video acquired by the video acquirer;

an open/closed eye detector that detects an open state and a closed state of eyes in the video acquired by the video acquirer; and an imaging control unit that changes an open period of a shutter in the video acquirer and a light emission intensity of the light irradiator based on the speed detected by the motion detector and the open state and the closed state of the eyes detected by the open/closed eye detector, wherein when an object that reduces a wavelength range of light radiated by the light irradiator is sensed, the imaging control unit changes the open period of the shutter and the light emission intensity.

\* \* \* \* \*